United States Patent
Clyburn

(10) Patent No.: US 9,157,571 B2
(45) Date of Patent: Oct. 13, 2015

(54) FEATURES FOR SECURING TAPE TO ANNULAR BAND

(71) Applicant: BALLUFF, INC., Florence, KY (US)

(72) Inventor: C. Wayne Clyburn, Union, KY (US)

(73) Assignee: Balluff, Inc., Florence, KY (US)

( * ) Notice: Subject to any disclaimer, the term of this patent is extended or adjusted under 35 U.S.C. 154(b) by 113 days.

(21) Appl. No.: 13/848,778

(22) Filed: Mar. 22, 2013

(65) Prior Publication Data

US 2013/0248666 A1 Sep. 26, 2013

Related U.S. Application Data

(60) Provisional application No. 61/614,919, filed on Mar. 23, 2012.

(51) Int. Cl.
| | |
|---|---|
| *F16B 1/00* | (2006.01) |
| *F16M 13/02* | (2006.01) |
| *G02B 5/10* | (2006.01) |
| *F24J 2/16* | (2006.01) |
| *F24J 2/38* | (2014.01) |
| *F24J 2/54* | (2006.01) |

(52) U.S. Cl.
CPC . *F16M 13/02* (2013.01); *F24J 2/16* (2013.01); *F24J 2/38* (2013.01); *F24J 2/542* (2013.01); *G02B 5/10* (2013.01); *F16B 2001/0035* (2013.01); *F24J 2002/5475* (2013.01); *Y02E 10/47* (2013.01)

(58) Field of Classification Search
USPC ........ 248/230.8, 228.8, 229.17, 309.4, 206.5; 359/843, 871, 872; 24/303, 20 R, 20 EE, 24/22

See application file for complete search history.

(56) References Cited

U.S. PATENT DOCUMENTS

| | | | | |
|---|---|---|---|---|
| 3,407,507 | A * | 10/1968 | Brubaker | 33/555.4 |
| 3,497,745 | A * | 2/1970 | Boeing | 313/456 |
| 4,917,644 | A * | 4/1990 | Sunshine | 446/26 |
| 4,991,409 | A * | 2/1991 | Creates | 63/15.7 |
| 6,945,503 | B2 * | 9/2005 | Cohen | 248/206.5 |
| 7,887,390 | B2 * | 2/2011 | Dowe | 450/91 |
| 2005/0001118 | A1 * | 1/2005 | Whittaker | 248/206.5 |
| 2006/0287567 | A1 * | 12/2006 | Hsieh | 600/15 |
| 2010/0064544 | A1 * | 3/2010 | Luong et al. | 34/239 |

* cited by examiner

*Primary Examiner* — Alfred J Wujciak
(74) *Attorney, Agent, or Firm* — Frost Brown Todd LLC

(57) ABSTRACT

A tracking band comprises a magnetic tape and mounting tabs that secure the magnetic tape within a band clamp. The mounting tabs protrude radially inwardly toward a center region defined by the band clamp. The magnetic tape is precision-coded with a sequence of magnetic poles. The tracking band may be disposed within an annular recess of a rotating shaft of a heliostat. The tracking band may rotate with the rotating shaft. The shaft may be coupled with a mirror such that the mirror and rotating shaft rotate concurrently. As the tracking band rotates with the rotating shaft, the tracking band may pass by an encoder head, which may read the magnetic tape and relay information regarding the angular position of the mirror from the magnetic tape to a control system. The tracking band may thus provide altitude and azimuth position information for the mirror to a control system.

18 Claims, 5 Drawing Sheets

FEATURES FOR SECURING TAPE TO ANNULAR BAND

PRIORITY

This application claims priority to U.S. Provisional Pat. App. No. 61/614,919, entitled "Features for Securing Tape to Annular Band," filed Mar. 23, 2012, the disclosure of which is incorporated by reference herein.

BACKGROUND

Some installations that generate electricity from solar power include one or more heliostats. A heliostat is a mechanism that positions a large mirror to continuously focus the sun's rays on a heat collection target or some other type of target. The heat collected on this target may be used to produce steam that drives turbines for electric power generation. Alternatively, the rays may be used for other purposes. A heliostat may include an altazimuth mount, which is operable to rotate a minor about a horizontal axis (altitude) and/or about a vertical axis (azimuth) relative to the ground. In some instances, it may be desirable to controllably track movement of the minor about one or both of these axes. While a variety of devices have been made or used, it is believed that no one prior to the inventor(s) has made or used an invention as described herein.

BRIEF DESCRIPTION OF THE DRAWINGS

It is believed the present invention will be better understood from the following description of certain examples taken in conjunction with the accompanying drawings, in which like reference numerals identify the same elements and in which.

Figure 1:
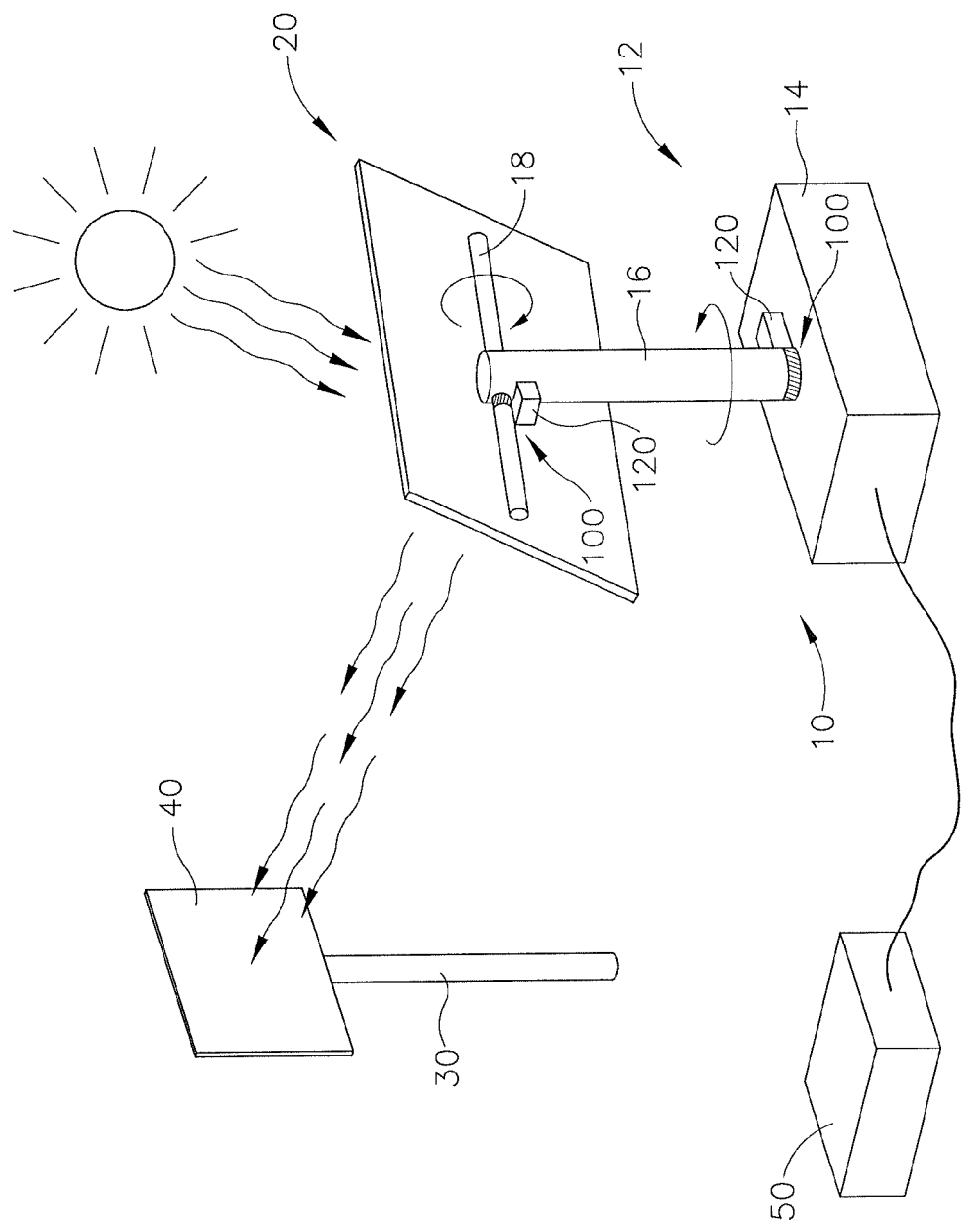
FIG. 1 depicts a schematic view of an exemplary solar power installation.

The drawings are not intended to be limiting in any way, and it is contemplated that various embodiments of the invention may be carried out in a variety of other ways, including those not necessarily depicted in the drawings. The accompanying drawings incorporated in and forming a part of the specification illustrate several aspects of the present invention, and together with the description serve to explain the principles of the invention; it being understood, however, that this invention is not limited to the precise arrangements shown.

DETAILED DESCRIPTION

The following description of certain examples of the invention should not be used to limit the scope of the present invention. Other examples, features, aspects, embodiments, and advantages of the invention will become apparent to those skilled in the art from the following description, which is by way of illustration, one of the best modes contemplated for carrying out the invention. As will be realized, the invention is capable of other different and obvious aspects, all without departing from the invention. Accordingly, the drawings and descriptions should be regarded as illustrative in nature and not restrictive.

FIG. 1 shows an exemplary solar power installation, which includes a target (40) mounted to a tower (30) and a minor (20) mounted to a heliostat (10). Heliostat (10) includes an altazimuth mount (12) comprising a base (14), a vertical post (16), and a horizontal post (18). Minor (20) is secured to horizontal post (18). In the present example, altazimuth mount (12) is operable to rotate minor (20) about a horizontal axis (altitude) by rotating horizontal post (18) relative to vertical post (16). Altazimuth mount (12) is further operable to rotate mirror (20) about a vertical axis (azimuth) by rotating horizontal post (18) relative to base (14). Of course, mirror (20) may be rotated about horizontal and/or vertical axes in numerous other ways as will be apparent to those of ordinary skill in the art in view of the teachings herein. For instance, one or more mounting brackets coupled to either or both of posts (16, 18) may include rotatable features, such that either or both of posts (16, 18) do not rotate. In some versions, one or more electrical motors are used to drive rotation of minor (20), though it should be understood that any other suitable source(s) of driving power may be used.

Altazimuth mount (12) rotates mirror (20) in the present example in order vary the angle of mirror (20) with respect to the sun and with respect to target (40). In particular, heliostat (10) may be controlled to move mirror (20) about the vertical and horizontal axes to substantially continuously reflect the rays of the sun toward target (40). For instance, heliostat (10) may move mirror (20) such that the plane defined by minor (20) is kept perpendicular to the bisector of the angle between the directions of the sun and target (40), compensating for the earth's rotation relative to the sun. In some versions, heliostat (10) only adjusts minor (20) about the vertical axis. In some other versions, heliostat (10) only adjusts minor (20) about the horizontal axis. It should also be understood that some versions of heliostat (10) may provide further movement of minor (20), including but not limited to orbital movement about target (40). Other suitable heliostat (10) configurations and operabilities will be apparent to those of ordinary skill in the art in view of the teachings herein. Similarly, various forms and functionalities that may be provided for target (40) will be apparent to those of ordinary skill in the art in view of the teachings herein. It should also be understood that a heliostat (10) may include several mirrors (20); and/or that several heliostats (10) may be used for one target (40).

Heliostat (10) of the present example includes a pair of tracking bands (100). Each tracking band (100) comprises a band clamp (101) and a strip of magnetic tape (110). In some versions, a tracking band (100) encircles vertical post (16) and rotates about the vertical axis with mirror (20). In addition or in the alternative, a tracking band (100) may encircle horizontal post (18) and rotate about the horizontal axis with mirror (20). In either case, tracking band (100) may be disposed within an annular recess or groove formed in the surface of the respective rotating posts (16, 18) of heliostat (10). Band clamp (101) is configured to secure magnetic tape (110) relative to post (16, 18) as will be described in greater detail below. Magnetic tape (110) is operable to provide angular positioning information as will also be described in greater detail below.

Figure 2:
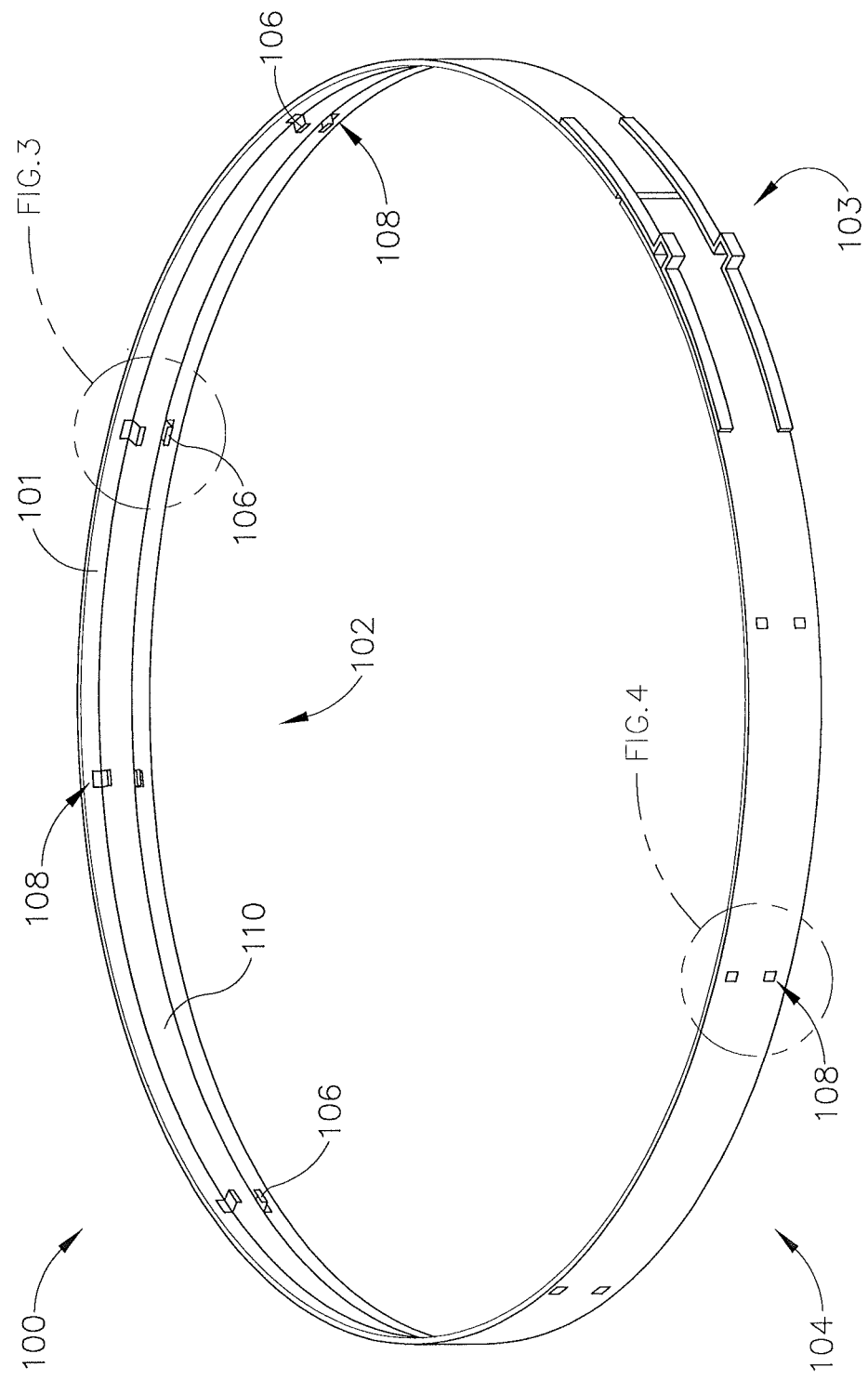
FIG. 2 depicts a perspective view of an exemplary tracking band from the installation of FIG. 1.

Band clamp (101) of the present example is formed of an annular band of sheet metal, though it should be understood that band clamp (101) may be formed of any other suitable material(s) and/or may take any other suitable form/configuration. As shown in FIG. 2, band clamp (101) includes a securing assembly (103) that is operable to selectively secure the two ends of band clamp (101) relative to each other. For instance, when securing assembly (103) is in an unlocked configuration, band clamp (101) may be loosely positioned about post (16, 18) and slid along the length of post (16, 18) until tracking band (100) reaches the desired position (e.g., annular recess) along the length of post (16, 18). Once tracking band (100) has been appropriately positioned, band clamp (101) may be cinched down to clamp tracking band (100) about post (16, 18), reducing the effective inner diameter of tracking band (100) until tracking band (100) has reached the appropriate degree of snugness about post (16, 18) (e.g., within an annular recess). Securing assembly (103) may then be placed in a locked configuration to maintain the desired fit between tracking band (100) and post (16, 18). By way of example only, securing assembly (103) may be configured and operable in accordance with at least some of the teachings of U.S. patent application Ser. No. 13/681,486, entitled "Measuring Body Device for a Position/Path Measurement System, Position/Path Measurement System and Application on which a Position/Path Measurement System is Installed," filed Nov. 20, 2012, the disclosure of which is incorporated by reference herein; International Patent Pub. No. WO 2011/144436, entitled "Measuring Body Device for a Position/Path Measurement System, Position/Path Measurement System and Application on which a Position/Path Measurement System is Installed," published Nov. 24, 2011, the disclosure of which is incorporated by reference herein; and or Gebrauchsmusterschrift DE 20 2010 007 285, filed May 21, 2010, the disclosure of which is incorporated by reference herein.

Figure 5:
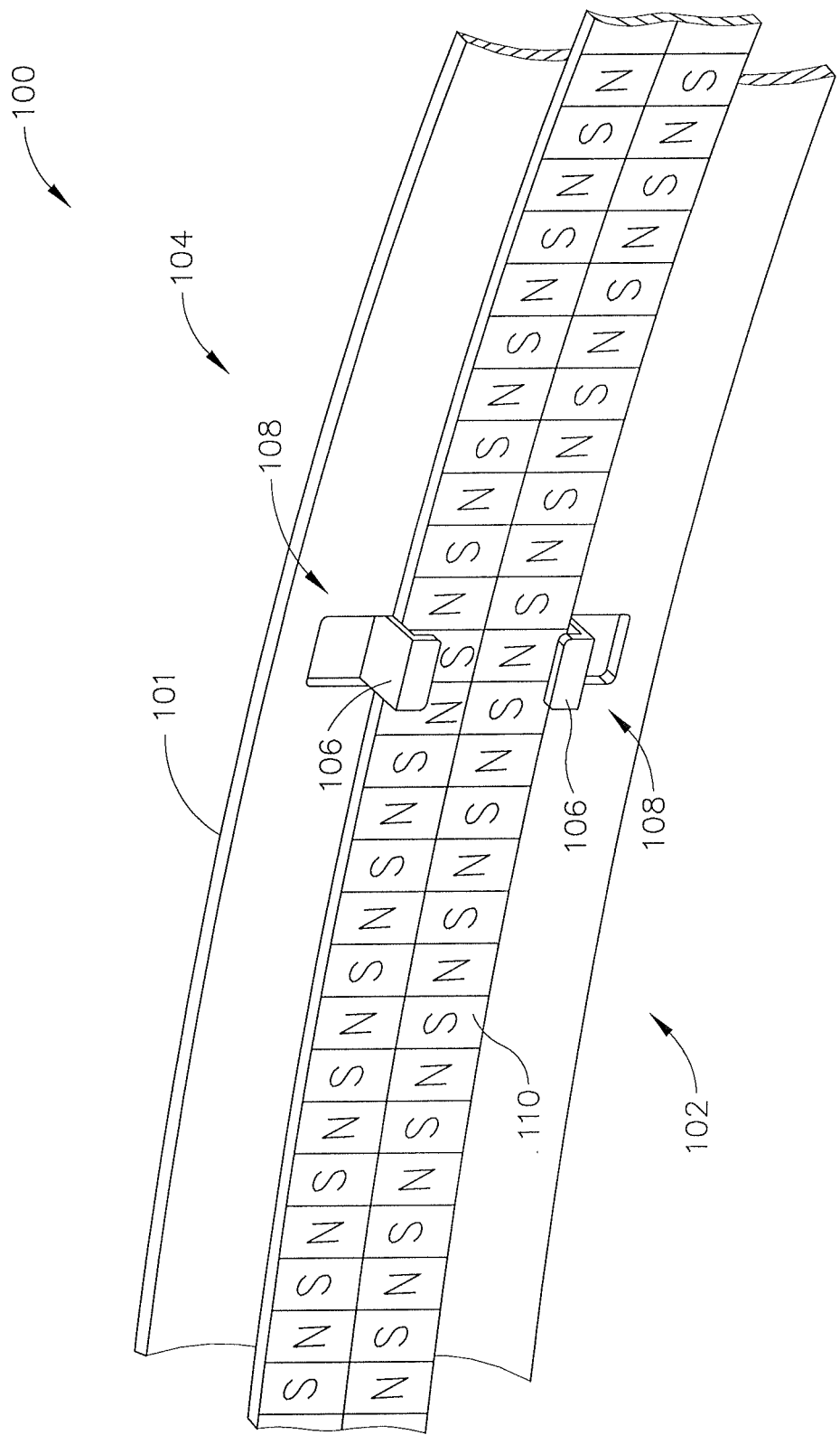
FIG. 5 depicts a partial perspective view of the inner region of the tracking band of FIG. 2, showing encoder tape secured by the encoder tape mounting tabs.

As shown in FIGS. 2 and 5, magnetic tape (110) is positioned in an inner region (102) of band clamp (101) in this example, though it should be understood that magnetic tape (110) may be positioned at an outer region (104) of band clamp (101) in addition to or in lieu of having magnetic tape (110) positioned in inner region (102) of band clamp (101). Magnetic tape (110) of this example comprises a strip of magnetic material that is precision-coded with a sequence of magnetic poles. Magnetic tape (110) is positioned to pass by an encoder head (120) that is configured to read the sequence of magnetic poles as band clamp (101) rotates, to determine the angular position of band clamp (101), which will in turn indicate the angular position of mirror (20). These high-resolution position signals are transmitted to and processed by a control system (50). Various suitable forms that encoder head (120) may take will be apparent to those of ordinary skill in the art in view of the teachings herein. Similarly, various suitable ways in which encoder head (120) may be positioned in relation to tracking band (100) will be apparent to those of ordinary skill in the art in view of the teachings herein. By way of example only, magnetic tape (110) and/or encoder head (120) may be configured and operable in accordance with at least some of the teachings of U.S. Pub. No. 2010/0219811, entitled "Encoded Scale Body and Position/Displacement Measuring System," published Sep. 2, 2010, the disclosure of which is incorporated by reference herein.

Figure 3:
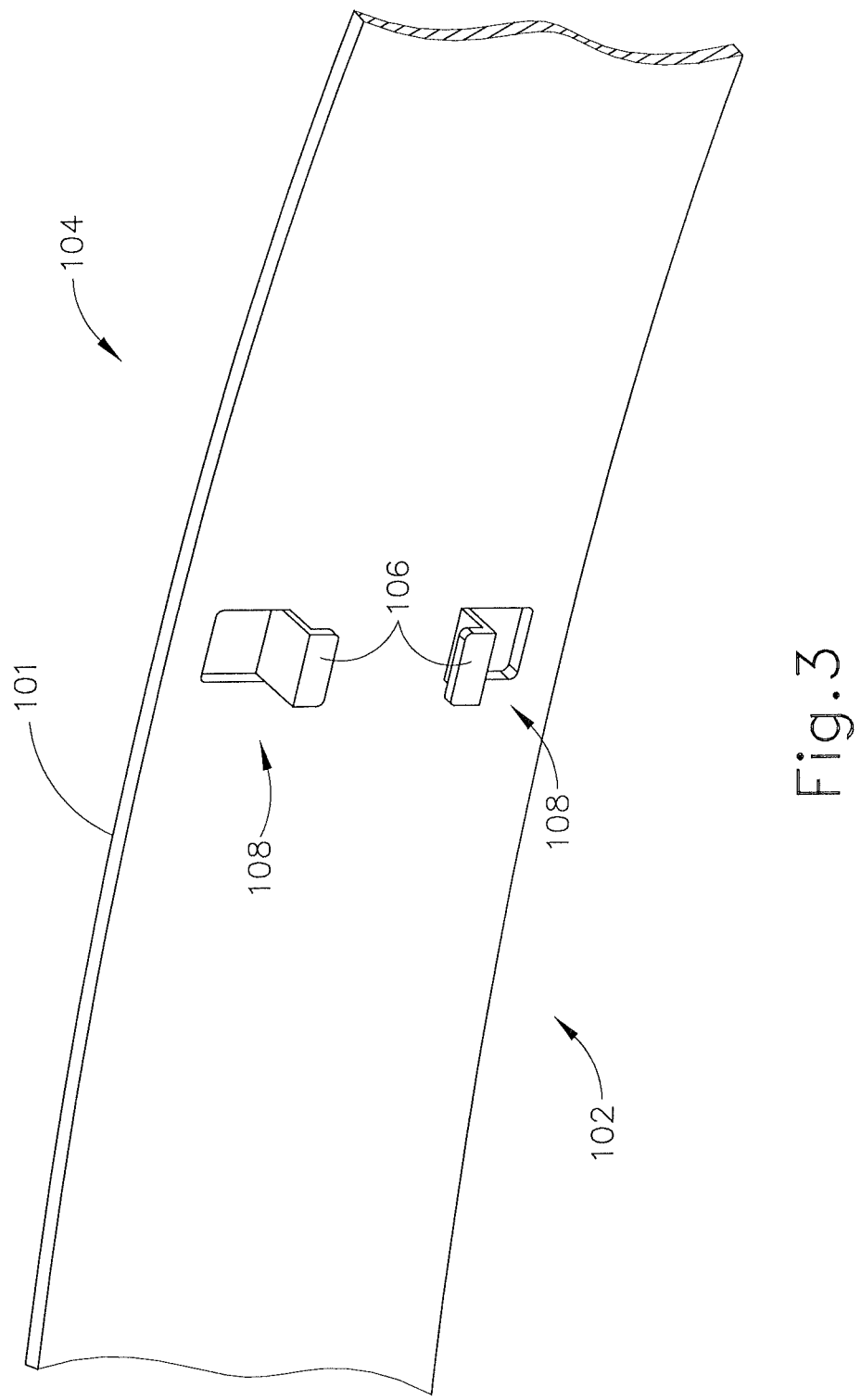
FIG. 3 depicts a partial perspective view of the inner region of the tracking band of FIG. 2, showing encoder tape mounting tabs.
Figure 4:
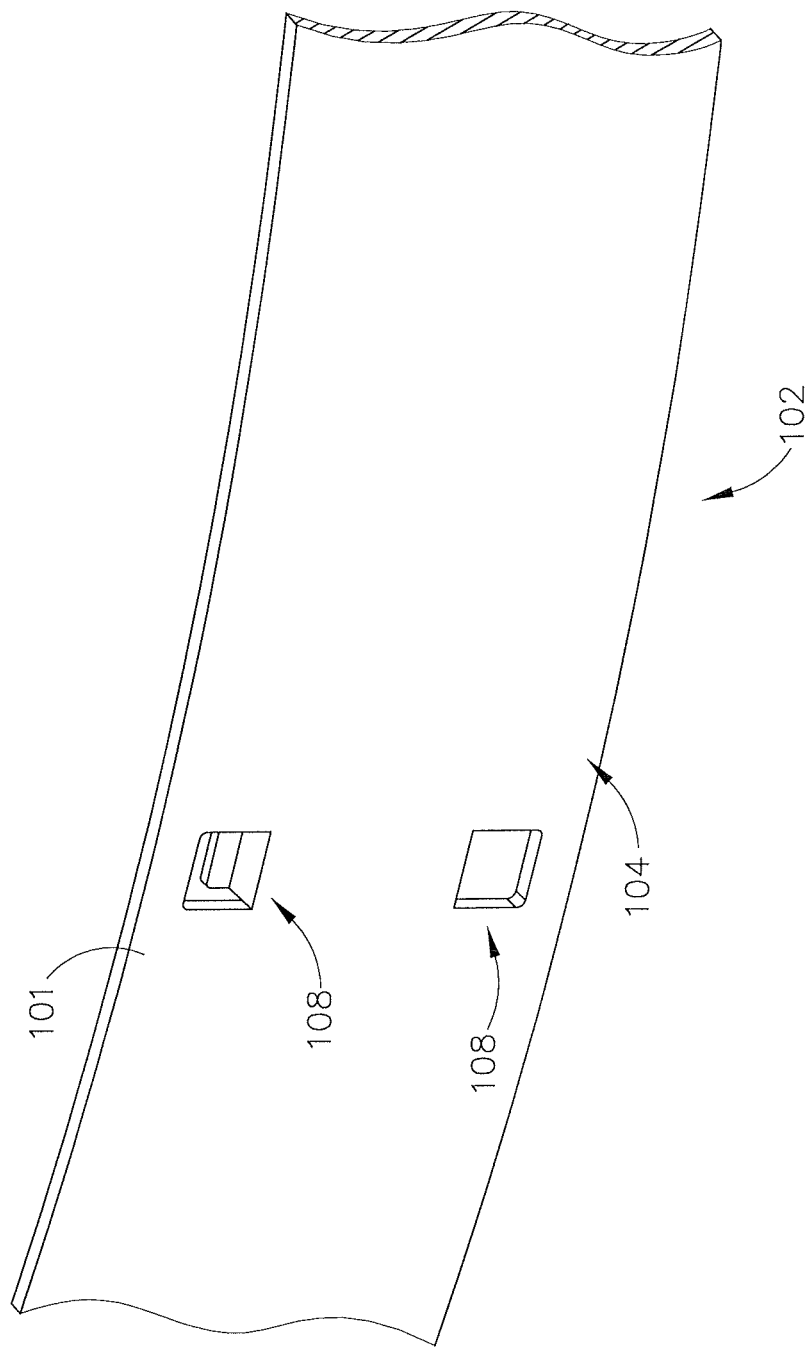
FIG. 4 depicts a partial perspective view of the outer region of the tracking band of FIG. 2, showing openings associated with encoder tape mounting tabs.

In the present example, one end of the strip forming magnetic tape (110) is bonded to band clamp (101) (e.g., by an adhesive) while the rest of magnetic tape (110) is not bonded to band clamp (101). Instead, the rest of magnetic tape (110) is retained against band clamp (101) by a circumferential array of mounting tab (106) pairs, which are best seen in FIGS. 2-3 and 5. Mounting tabs (106) are formed by first forming U-shaped cuts in band clamp (101) (e.g., through stamp/die-cutting, laser cutting, etc), then bending tabs that are formed by such U-cuts. As best seen in FIG. 3, the tabs are bent radially inwardly toward the center of band clamp (101), then toward each other to ultimately form opposing L-shapes. Magnetic tape (110) is positioned against the inner face (102) of band clamp (101), between these L-shaped mounting tabs (106), and is thus retained in place by the L-shaped mounting tabs (106) as best seen in FIG. 5. Any suitable number of L-shaped mounting tabs (106) may be provided along the circumference of band clamp (101). As can also be seen in FIGS. 3-4, the formation of mounting tabs (106) leaves openings (108) formed in band clamp (101).

In the present example, mounting tabs (106) hold magnetic tape (110) in the annular configuration defined by band clamp (101); yet mounting tabs (106) also allow magnetic tape (110) to slide relative to band clamp (101). In particular, due to the fact that only one end of magnetic tape (110) is bonded to band clamp (101), and due to the configuration of mounting tabs (106), magnetic tape (110) may slide relative to band clamp (101) about an axis at the center defined by band clamp (101). Such sliding may be necessary when band clamp (101) is being wrapped and clamped around the rotating post (16, 18) of the heliostat (10). For instance, band clamp (101) and magnetic tape (110) may be provided as a single assembly that may be loosely positioned about post (16, 18), this assembly may then be clamped down to fit generally snugly against post (16, 18). During this clamping down, magnetic tape (110) may slide relative to band clamp (101), which may prevent magnetic tape (110) from getting torn during the clamp-down process. Magnetic tape (110) and band clamp (101) may thus be readily installed in a single operation, without having to install magnetic tape (110) and band clamp (101) in separate steps, and without creating a risk of magnetic tape (110) tearing during the installation/clamp-down process. In some versions, magnetic tape (110) does not slide relative to the rotating post (16, 18) after installation is complete and securing assembly (103) has been locked.

While the teachings herein have been provided in the context of heliostat (10), it should be understood that the teachings herein may be readily applied to a variety of other contexts. In particular, it should be understood that a tracking band (100) as taught herein may be positioned about a variety of other kinds of posts and other structures.

Having shown and described various embodiments of the present invention, further adaptations of the methods and systems described herein may be accomplished by appropriate modifications by one of ordinary skill in the art without departing from the scope of the present invention. Several of such potential modifications have been mentioned, and others will be apparent to those skilled in the art. For instance, the examples, embodiments, geometrics, materials, dimensions, ratios, steps, and the like discussed above are illustrative and are not required. Accordingly, the scope of the present invention should be considered in terms of any claims that may be presented and is understood not to be limited to the details of structure and operation shown and described in the specification and drawings.

I claim:

1. An apparatus for tracking a heliostat, the apparatus comprising;
 (a) a band, wherein the band comprises two ends and a plurality of mounting tab pairs disposed between the two ends, wherein the band is configured to define a circumference;
 (b) a magnetic tape, wherein the magnetic tape is secured to the band by the mounting tab pairs, wherein the magnetic tape extends along the circumference of the band between at least two discrete mounting tab pairs;

(c) a securing feature operable to selectively secure the positions of the two ends relative to each other to thereby secure the length of the circumference; and (d) a rotating member, wherein the band is secured to the rotating member such that the band is configured to rotate with the rotating member.

2. The apparatus of claim 1, wherein the band is bent to form a circular shape, wherein the mounting tabs protrude radially inwardly toward a center of the circular shape defined by the band.

3. The apparatus of claim 1, wherein each pair of mounting tabs forms a respective channel along the circumference of the band.

4. The apparatus of claim 1, wherein the mounting tabs are L-shaped.

5. The apparatus of claim 4, wherein the mounting tabs are arranged in pairs of vertically opposing L-shapes.

6. The apparatus of claim 1, wherein the mounting tabs are arranged in an annular pattern in an internal region defined by the band.

7. The apparatus of claim 1, wherein the magnetic tape is slidable relative to the band.

8. The apparatus of claim 7, wherein the magnetic tape has a first end and a second end, wherein the first end is bonded to the band, wherein the second end is free to slide relative to the band.

9. The apparatus of claim 1, wherein the band is bent to form a circular shape, wherein the magnetic tape is disposed within an interior of the circular shape defined by the band.

10. The apparatus of claim 1, wherein the rotating member defines an annular recess in an exterior of the rotating member, wherein the band is disposed within the annular recess of the rotating member.

11. The apparatus of claim 1, further comprising an encoder head, wherein the encoder head is configured to read the magnetic tape and relay information from the magnetic tape to a control system.

12. The apparatus of claim 1, further comprising a heliostat, wherein the heliostat comprises:

(i) an upright member, and (ii) a mirror coupled with the upright member, wherein the mirror is rotatable through a plurality of angular positions, wherein the magnetic tape is operable to indicate the angular position of the mirror.

13. The apparatus of claim 12, wherein the mirror is rotatable about a vertical axis, wherein the magnetic tape is operable to indicate the angular position of the mirror relative to the vertical axis.

14. The apparatus of claim 12, wherein the mirror is rotatable about a horizontal axis, wherein the magnetic tape is operable to indicate the angular position of the mirror relative to the horizontal axis.

15. A heliostat, wherein the heliostat comprises:

(a) a mirror;

(b) a rotating member, wherein the mirror is coupled to the rotating member;

(c) a tracking assembly, wherein the tracking assembly is configured to rotate with the rotating member, wherein the tracking assembly comprises:

(i) a band, wherein the band comprises a plurality of mounting tabs, and (ii) a magnetic tape, wherein the magnetic tape is secured to the band by the mounting tabs, wherein the magnetic tape is coded with a sequence of magnetic poles; and (d) an encoder head, wherein the encoder head is configured to read the magnetic tape and communicate information regarding the position of the mirror from the magnetic tape to a control system.

16. The apparatus of claim 15, wherein the mounting tabs protrude radially inwardly toward a center region defined by the band, and wherein the mounting tabs are arranged in pairs such that each pair of mounting tabs forms a channel along a circumference defined by the band.

17. The apparatus of claim 15, wherein the rotating member presents a recessed grove in an exterior of the rotating member, and wherein the band is disposed within the recessed groove of the rotating member.

18. An apparatus for tracking a heliostat, the apparatus comprising;

(a) a band, wherein the band comprises two ends and a plurality of mounting tab pairs disposed between the two ends, wherein the band is configured to define a circumference;

(b) a magnetic tape, wherein the magnetic tape is secured to the band by the mounting tab pairs, wherein the magnetic tape extends along the circumference of the band between at least two discrete mounting tab pairs;

(c) a securing feature operable to selectively secure the positions of the two ends relative to each other to thereby secure the length of the circumference; and (d) an encoder head, wherein the encoder head is configured to read the magnetic tape and relay information from the magnetic tape to a control system.

* * * * *